United States Patent Office 3,231,577
Patented Jan. 25, 1966

3,231,577
PRODUCTION OF OXAZOLIDINONES
Wilhelm E. Walles, Midland, Mich., assignor to The Dow Chemical Company, a corporation of Michigan
No Drawing. Filed July 25, 1960, Ser. No. 44,893
2 Claims. (Cl. 260—307)

This invention relates to the oxyalkylation of isocyanuric acid, to the products produced by such oxyalkylation and to the conversion of such products into oxazolidinones.

It is known that ethylene oxide can be condensed with cyanuric acid in the presence of a basic catalyst to produce 1,3,5-tris(2-hydroxyethyl) isocyanurate and that the latter, when heated in a vacuum, without catalyst, is converted to oxazolidinone.

According to the invention alkylene oxides are condensed with cyanuric acid by use of acidic catalyst to produce 1,3,5-tris(2-hydroxyalkyl) isocyanurates. The latter are converted to oxazolidinones by heating in the presence of basic catalysts. These reactions can be represented as follows:

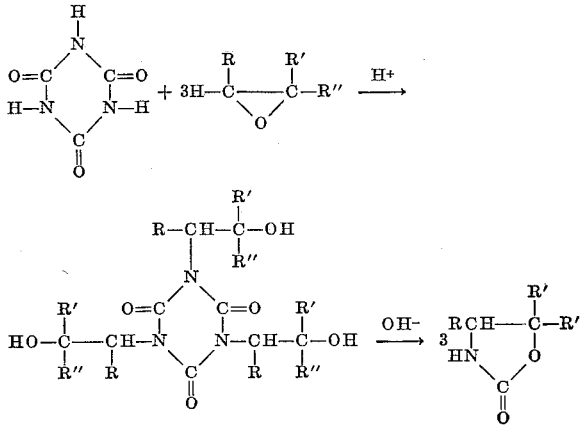

wherein R and R' are hydrogen or lower alkyl radicals and R" is a lower alkyl or a phenyl radical.

Among the alkylene oxides useful in the first step of the process are propylene oxide, 1,2- and 2,3-butylene oxides, isobutylene oxide, styrene oxide and the like. It is preferred to use the stoichiometric amount of oxide; i.e., three moles per mole of isocyanuric acid. Less yields a mixture of partially oxyalkylated products while more favors the formation of polyoxyalkylene chains.

Suitable acid catalysts for the first step in our process include various strong mineral acids, such as sulfuric acid, alkali metal bisulfates, sulfonic acids, hydrochloric acid, hydrobromic acid, phosphoric acid, strong acid ion-exchange resins, and the like. Only a small amount is required, suitable amounts being of the order of 0.1 to 2%, by weight, based on the combined reactants.

Since the reaction of alkylene oxides with cyanuric acid is exothermic, it is preferable, though not essential, to conduct the reaction in an inert solvent, such as dioxane or dimethyl formamide, in order to dilute the reactants and facilitate temperature control.

The following example shows the effect of various catalysts.

Example 1

In each of three experiments, 754 g. of cyanuric acid were dissolved in 4 liters of dimethyl formamide. The solution was placed in a closed reactor and heated to 160° C., after which 945 g. of propylene oxide were slowly pumped in while the temperature was maintained constant. Stirring and heating at 160° were continued for 2 hours, after which the reactor was cooled and the solvent was removed by vacuum distillation. The residue was subjected to high-vacuum distillation, the 1,3,5-tris(2-hydroxypropyl) isocyanurate, if any, distilled at 199° C. (0.6 mm.) while the final residue was essentially cyanuric acid. The reaction mixtures could also be analyzed by infra-red analysis.

The only variable in the above three experiments was the catalyst used, the results being as follows:

| Example | Catalyst | Yield of tris-hydroxypropyl isocyanurate, percent |
|---|---|---|
| 1A | $H_2SO_4$, 1% | 90 |
| 1B | NaOH, 0.8% | 0 |
| 1C | None | 35 |

Example 2

Into a pressure reactor was put 129.1 g. (1 mole) of cyanuric acid, 174.6 g. (3 moles) of propylene oxide, 600 ml. of dimethyl formamide and 2 ml. of 96% sulfuric acid. The vessel was then heated at 170° C. for 30 min., during which time the charge was continuously agitated. The reactor was then cooled and the solvent removed by distillation at 1 mm. pressure. The residue was a very viscous liquid and was shown by infra-red analysis to consist essentially of 1,3,5-tris(2-hydroxypropyl) isocyanurate.

The 1,3,5-tris(2-hydroxyalkyl) isocyanurates of the invention are typical polyols in that they are viscous, neutral liquids having considerable affinity for water. They are useful for most of the purposes for which other polyols are used; e.g., they are readily esterified with monocarboxylic acids to form monomeric esters useful as plasticizers for cellulosic plastics such as ethylcellulose, cellulose esters and hydroxyalkyl cellulose. They are also readily esterified with dicarboxylic acids to form polyester resins useful as surface coatings and molding plastics.

A special utility of the hydroxyalkyl isocyanurates is as an intermediate for making oxazolidinones as described hereinbefore. When heated above about 200° C. under vacuum, preferably at a pressure below about 5 mm., they cleave to form three moles of the corresponding oxazolidinone. This reaction occurs in the absence of any catalyst. However, we have discovered that it is markedly catalyzed by bases and inhibited by acids. These effects are illustrated by the following examples.

Example 3

In a series of three experiments, pure 1,3,5-tris(2-hydroxypropyl) isocyanurate was heated at 150° C. under a pressure of less than 1 mm. for a period of 3 hours. Under these conditions, any 5-methyl-2-oxazolidinone produced was distilled from the still-pot and collected in the condenser. Results were as follows:

| Example | Catalyst | Oxazolidinone, Percent Yield |
|---|---|---|
| 3A | $H_2SO_4$, 1% | 0 |
| 3B | NaOH, 1% | 35 |
| 3C | None | 0 |

In Example 3A there was some decomposition and loss of hydroxypropyl isocyanurate while in Examples 3B and 3C any isocyanurate not converted to oxazolidinone was recovered unchanged. The catalytic effect of NaOH shown in Example 3 is likewise shown by other inorganic alkalies. At higher temperatures, such as 250° C., the catalytic effect substantially diminishes because the isocyanurate rapidly cleaves to the oxazolidinone even in the absence of catalyst.

By using one of the butylene oxides or styrene oxide instead of the propylene oxide used in the above examples, there is obtained the corresponding ethyl, dimethyl- or phenyl-substituted 2-hydroxyethyl isocyanurate. These in turn cleave when heated in vacuum to yield the corresponding ethyl, dimethyl- or phenyl-substituted 2-oxazolidinones.

By "lower alkyl" as used herein we mean alkyl radicals containing up to about four carbon atoms.

I claim:

1. A process for making an oxazolidinone corresponding to the formula

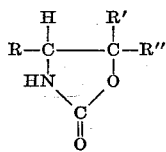

wherein R and R' are radicals selected from the group consisting of hydrogen and lower alkyl radicals and R" is a radical selected from the group consisting of hydrogen, lower alkyl and phenyl radicals, comprising heating in vacuum at a temperature of about 150° to 200° C., and in the presence of at least about 1% by weight of an alkali catalyst, a compound having the formula

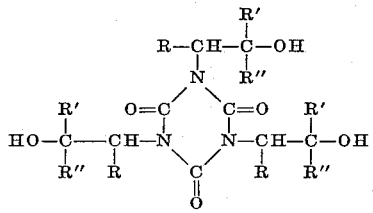

wherein R, R' and R" are as defined above.

2. The process for making 5-methyl-2-oxazolidinone comprising heating 1,3-5-tris(2-hydroxypropyl) isocyanurate in vacuum at about 150° to 200° C. and in the presence of at least 1% by weight of sodium hydroxide.

References Cited by the Examiner

UNITED STATES PATENTS

| | | | |
|---|---|---|---|
| 2,381,121 | 8/1945 | Ericks et al. | 260—248 XR |
| 2,894,950 | 7/1959 | Lloyd et al. | 260—248 |
| 2,913,460 | 11/1959 | Brown et al. | 260—248 |
| 2,915,527 | 12/1959 | Campbell et al. | 260—307 |
| 2,919,279 | 12/1959 | Walles et al. | 260—307 |
| 2,977,369 | 3/1961 | Dixon et al. | 260—307.3 |
| 2,977,371 | 3/1961 | Dixon | 260—307.3 |
| 3,020,262 | 2/1962 | Speranza | 260—307.3 |
| 3,088,948 | 5/1963 | Little et al. | 260—307.3 |
| 3,108,115 | 10/1963 | Little et al. | 260—307.3 |

FOREIGN PATENTS 118,042    2/1959    U.S.S.R.

OTHER REFERENCES

Allied Chemical Product Bulletin, Cyanuric Acid, May 1959, page 4.

Gulbins et al., German Auslegeschrift, Patent No. 1,068,715, Nov. 12, 1959.

Jones et al., J. Chem. Soc., 1957, pp. 4392–4.

Krasuskii et al., Chem. Abstracts, vol. 31, col. 1377 (1937).

Smolin et al., "S-Triazines and Derivatives," page 403, Interscience Pub. Inc., N.Y., February 1959.

Speranza et al., J. Org. Chem., vol. 23, pp. 1922–24 (1958).

NICHOLAS S. RIZZO, Primary Examiner.

H. J. LIDOFF, DUVAL T. McCUTCHEN, WALTER A. MODANCE, Examiners.